US011009180B2

(12) United States Patent
Geerds

(10) Patent No.: US 11,009,180 B2
(45) Date of Patent: May 18, 2021

(54) CAMERA MOUNT

(71) Applicant: Joergen Geerds, Astoria, NY (US)

(72) Inventor: Joergen Geerds, Astoria, NY (US)

(*) Notice: Subject to any disclaimer, the term of this patent is extended or adjusted under 35 U.S.C. 154(b) by 4 days.

(21) Appl. No.: 16/595,001

(22) Filed: Oct. 7, 2019

(65) Prior Publication Data

US 2020/0109813 A1 Apr. 9, 2020

Related U.S. Application Data

(60) Provisional application No. 62/742,099, filed on Oct. 5, 2018.

(51) Int. Cl.
*F16M 11/14* (2006.01)
*G03B 17/56* (2021.01)
*F16M 13/02* (2006.01)
*F16B 47/00* (2006.01)

(52) U.S. Cl.
CPC .......... *F16M 11/14* (2013.01); *F16B 47/00* (2013.01); *F16M 13/022* (2013.01); *G03B 17/561* (2013.01); *G03B 17/566* (2013.01)

(58) Field of Classification Search
USPC .......................................................... 396/419
See application file for complete search history.

(56) References Cited

U.S. PATENT DOCUMENTS

| | | | |
|---|---|---|---|
| 2,506,095 A | 5/1950 | Mantz | |
| 3,467,350 A | 9/1969 | Tyler | |
| 3,891,301 A | 6/1975 | Heller | |
| 4,233,634 A | 11/1980 | Adams | |
| 4,645,320 A | 2/1987 | Muelling et al. | |
| 4,700,808 A | 10/1987 | Haentjens | |
| 5,039,050 A | 8/1991 | Eidschun et al. | |
| 5,650,821 A | 7/1997 | Hewlett | |
| 5,778,259 A | 7/1998 | Rink | |
| 5,899,627 A * | 5/1999 | Dobrovolny | A61B 17/0206 403/384 |
| 5,940,644 A | 8/1999 | Putora | |
| 6,149,112 A | 11/2000 | Thieltges | |
| 6,899,442 B2 | 5/2005 | Howell et al. | |
| 7,090,416 B2 | 8/2006 | Mootz et al. | |
| 7,241,060 B2 | 7/2007 | Mootz et al. | |
| 7,303,171 B1 * | 12/2007 | Chen | B60R 11/00 224/908 |
| 7,530,542 B2 * | 5/2009 | Boyce | B60R 11/02 108/4 |
| 8,077,212 B2 | 12/2011 | Chapman | |
| 8,584,995 B2 * | 11/2013 | Russell | G03B 17/561 248/177.1 |

(Continued)

*Primary Examiner* — Clayton E. LaBalle
*Assistant Examiner* — Warren K Fenwick
(74) *Attorney, Agent, or Firm* — Alleman Hall Creasman & Tuttle LLP

(57) ABSTRACT

A camera mount having pivotable leg assemblies is disclosed. According to an example, a camera mount comprises: a base; a camera-mounting member coupled to the base upon which a camera is mountable; and a plurality of legs coupled to the base to support the base relative to a surface. Each leg of the plurality of legs may form a pivotable leg assembly that includes a pair of spaced apart brackets between which a pivot ball is retained. The pivotable leg assemblies of the camera mount may be adjusted to secure or otherwise rest the camera mount upon a surface, including planar or non-planar surfaces.

17 Claims, 5 Drawing Sheets

(56) References Cited

U.S. PATENT DOCUMENTS

| | | | | |
|---|---|---|---|---|
| 8,831,415 B2* | 9/2014 | Greenthal | ............... | F16M 11/10 |
| | | | | 396/12 |
| 8,956,068 B2* | 2/2015 | Mekid | ................... | F16M 11/043 |
| | | | | 403/122 |
| 9,821,721 B2* | 11/2017 | Casagrande | ............... | B60R 9/10 |
| 2005/0265711 A1* | 12/2005 | Heibel | .................... | F16M 11/42 |
| | | | | 396/419 |
| 2012/0288269 A1* | 11/2012 | Jensen | ................. | F16M 11/242 |
| | | | | 396/428 |
| 2016/0025264 A1* | 1/2016 | Casagrande | ......... | F16M 11/041 |
| | | | | 248/205.9 |
| 2016/0069506 A1* | 3/2016 | Shelef | .................... | F16M 11/14 |
| | | | | 403/221 |
| 2020/0166175 A1* | 5/2020 | Elias | .................... | F16M 11/245 |

* cited by examiner

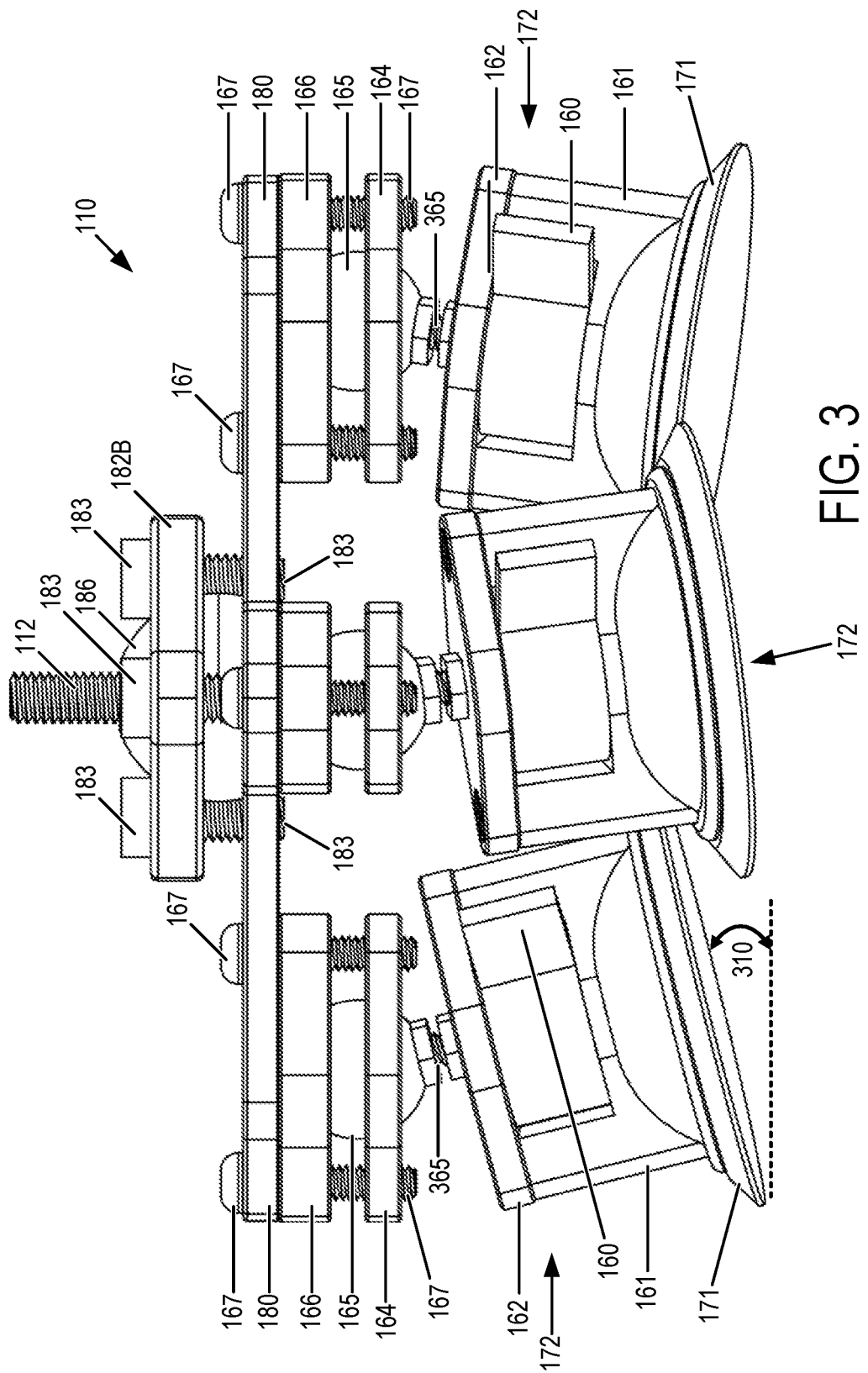

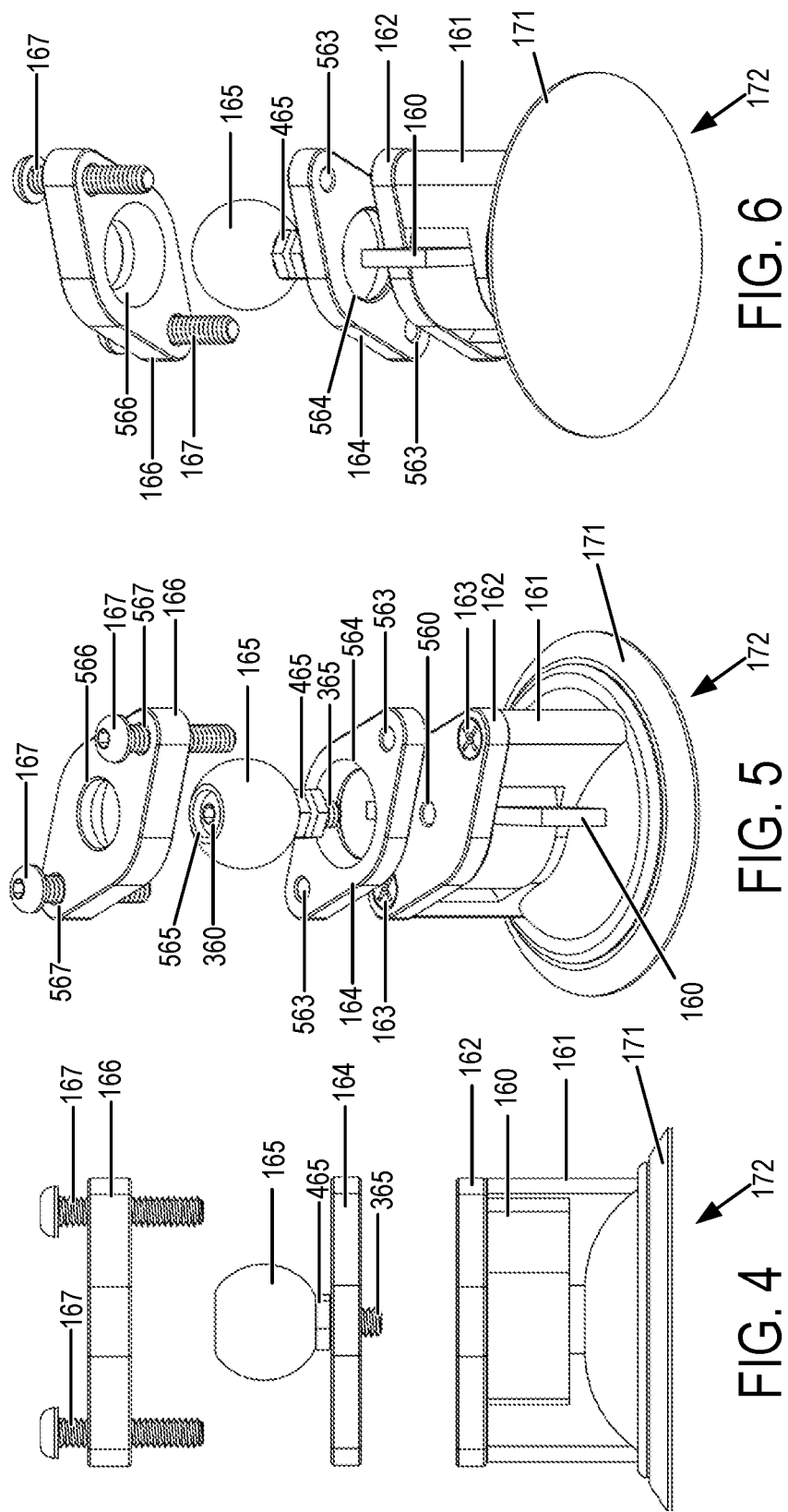

CAMERA MOUNT

CROSS REFERENCE TO RELATED APPLICATIONS

This application claims priority to and the benefit of U.S. provisional patent application No. 62/742,099, titled CAMERA MOUNT, the entire contents of which are incorporated herein by reference for all purposes.

BACKGROUND

Camera mounts may be used to mount a camera to another object.

SUMMARY

A camera mount having pivotable leg assemblies is disclosed. According to an example, a camera mount comprises: a base; a camera-mounting member coupled to the base upon which a camera is mountable; and a plurality of legs coupled to the base to support the base relative to a surface. Each leg of the plurality of legs may form a pivotable leg assembly that includes a pair of spaced apart brackets between which a pivot ball is retained. The pivotable leg assemblies of the camera mount may be adjusted to secure or otherwise rest the camera mount upon a surface, including planar or non-planar surfaces.

BRIEF DESCRIPTION OF THE DRAWINGS

FIGS. 2-7 depict another example camera mount having pivotable leg assemblies.

DETAILED DESCRIPTION

Figure 1:
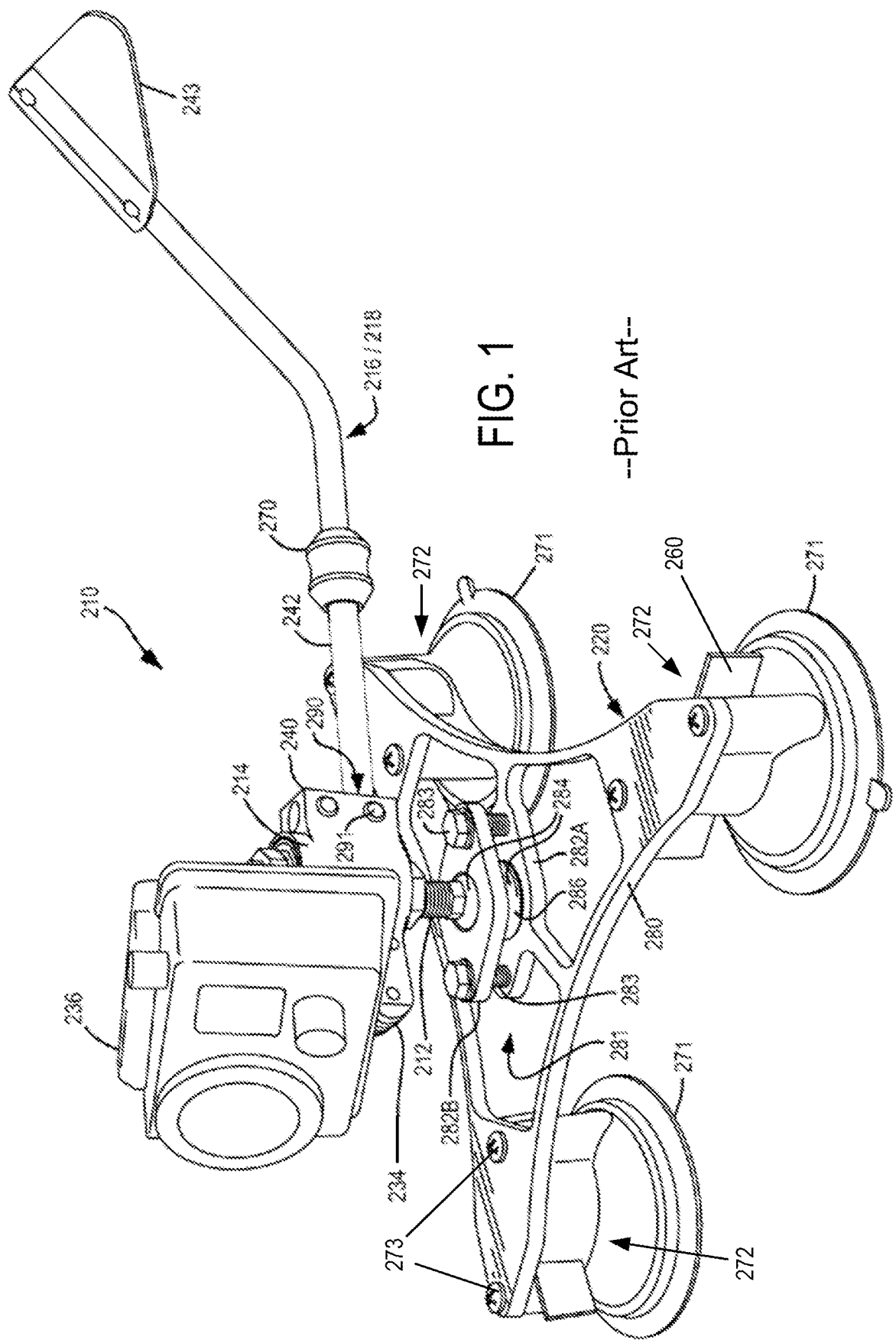
FIG. 1 depicts an example camera mount.
Figure 2:
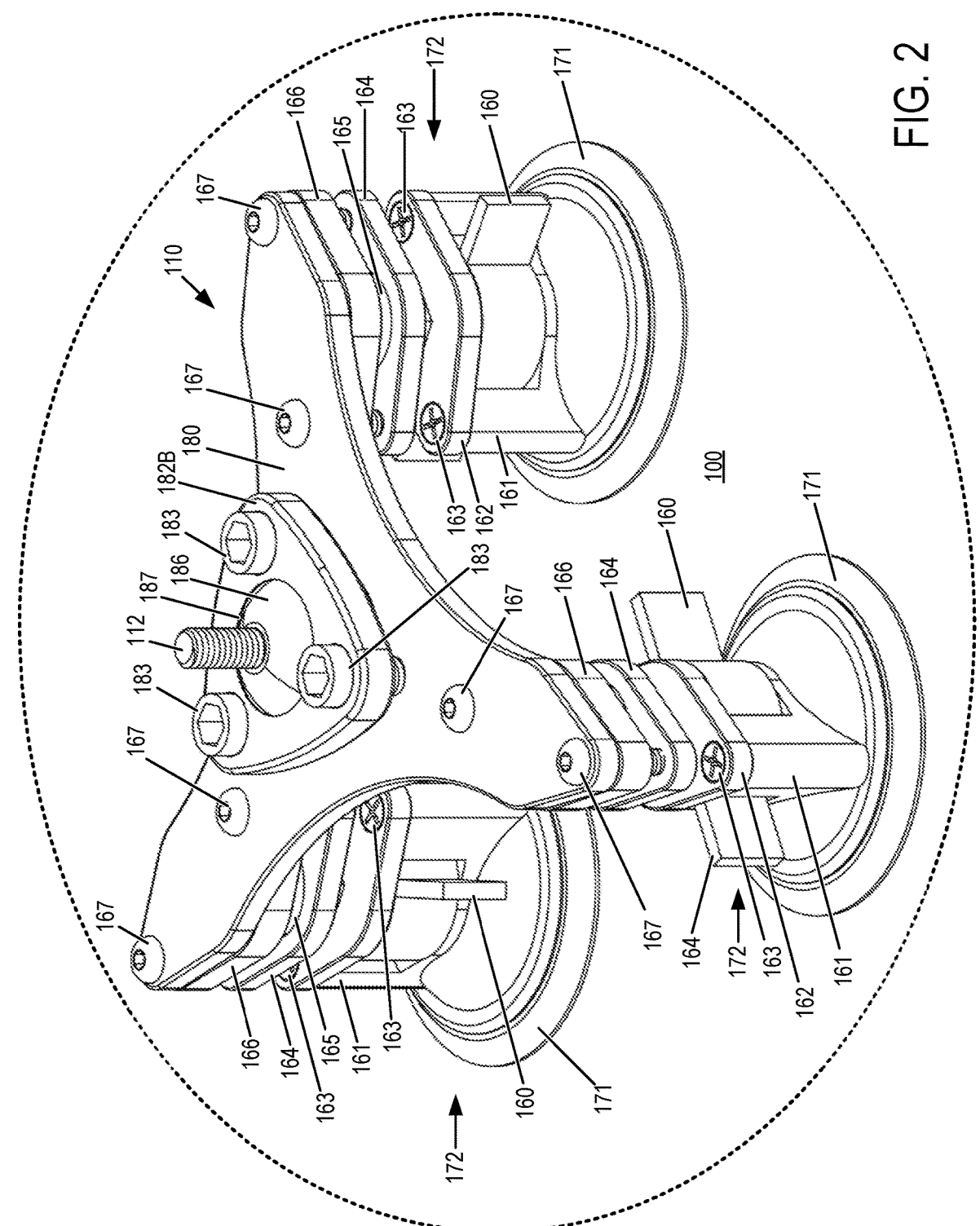
Figure 7:
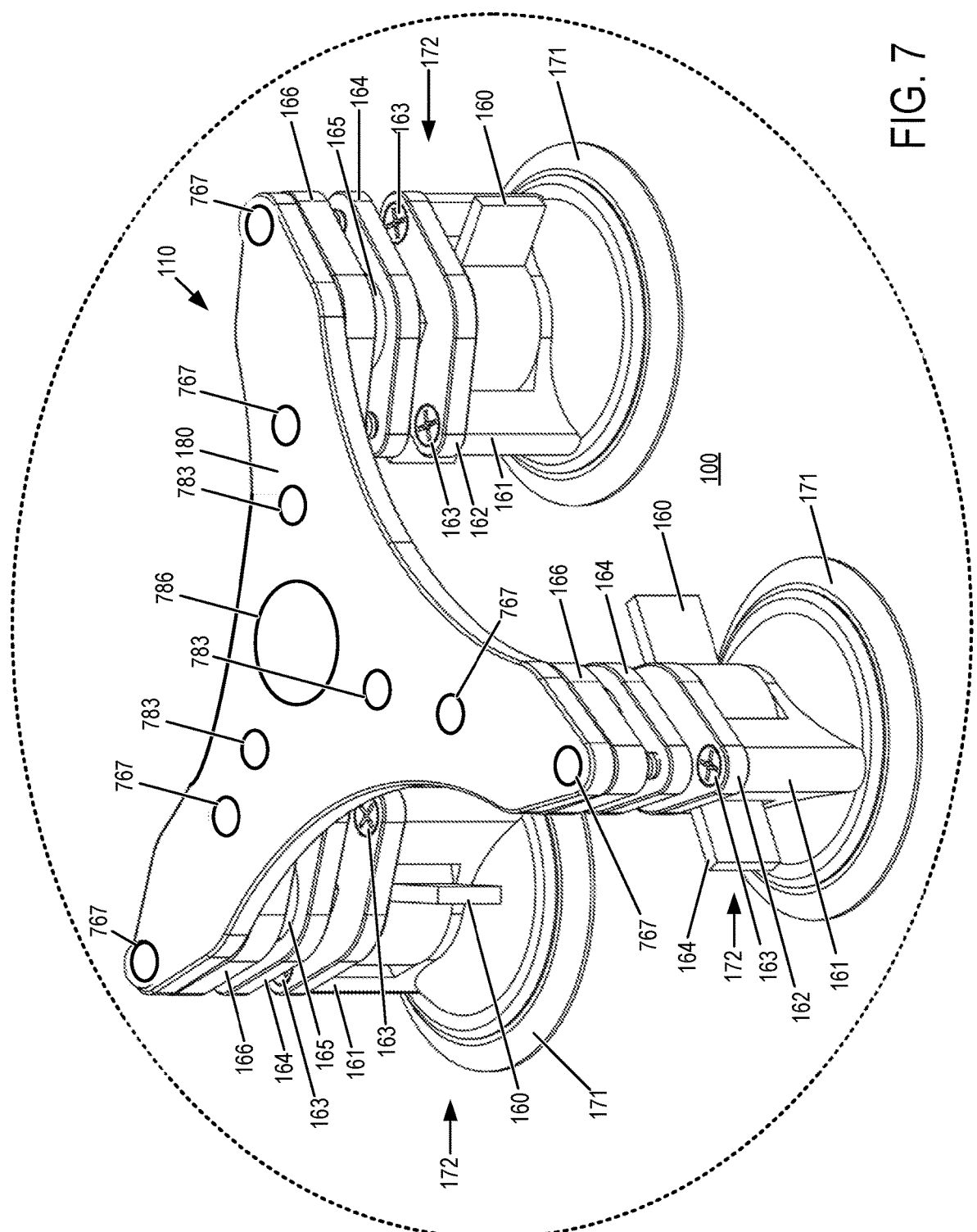

FIG. 1 is perspective view of an example camera mount 210. Camera mount 210 includes a coupling assembly 220 comprising a frame or base 280. In this example, base 280 has a generally equilateral triangular form, however, base 280 may take other suitable forms. Further, in this example, base 280 includes a lever actuated (e.g., via lever 260) suction cup 271 or other suitable coupling element disposed at each apex or distal end thereof for coupling to a surface of another object (e.g., a vehicle). It is understood that base 280 can employ a variety of other shapes or forms without departing from the scope of embodiments of the invention described herein. Coupling assembly 220 includes a tilt-adjustment assembly 281 which may be disposed generally centrally on frame 280. However, other suitable configurations may be used.

In this example, tilt-adjustment assembly 281 includes first and second spaced-apart bracket 282A and 282B. First bracket 282A may be integral with and centrally located on the frame 280 and second bracket 282B may be coupled to first bracket 282A via a pair of fasteners 283 spanning or otherwise inserted therebetween. Brackets 282A-B may each further include or otherwise define a central aperture 284 having a perimeter forming a portion of a sphere (e.g., a circular opening). A pivot-ball 286 is disposed at least partially within the apertures 284 and is captured or otherwise retained between the brackets 282A-B. A stud may extend from a portion of pivot-ball 286 that is exposed within the central aperture 284 of second bracket 282B for connection to a shaft 212 of camera coupling assembly 220. Alternatively, shaft 212 may be fixed to or integrally formed with pivot-ball 286. Pivot-ball 286 is pivotable in any direction (e.g., within three degrees of freedom including yaw, roll, and tilt) to enable positioning or repositioning of shaft 212 coupled thereto. One or both of fasteners 283 between first and second brackets 282A-B may be loosened to enable positioning or repositioning of pivot-ball 286 and then tightened to restrict or lock movement of pivot-ball 286, thereby locking the position or orientation of shaft 212 in place.

In at least some implementations, camera mount 210 may include a combined tail assembly 216 and swing-weight assembly 218. Camera mount 210, as depicted in FIG. 1, does not include a tail-brake mechanism, drag mechanism, or stop pin associated with tail assembly 216 or swing-weight assembly 218 (as disclosed e.g., in U.S. Pat. No. 8,831,415, issued Sep. 9, 2014, which is incorporated herein by reference in its entirety for all purposes), but may be configured to include one or more of these components to aid dampening or restricting rotational movements of body 214 with respect to shaft 212.

Arm 242 of tail assembly 216 may be inserted in a first bore 290 in tail-mount portion 240 of the body 214 and may be fixedly and removably coupled therein using a set screw or other suitable fastener 291 disposed in a transverse aperture that intersects first bore 290. Fastener 291 can retain arm 242 in first bore 290 by impinging on a sidewall thereof or by receipt in a hole, slot, or other feature in the sidewall of arm 242 among other suitable techniques. In an example, arm 242 may be formed from a single tube or rod and bent to include a first or horizontal segment 296 projecting from tail-mount portion 240 and a second or upwardly angled segment 297 at a distal end thereof. Wing 243 may be mounted on an upwardly angled segment 297 of arm 242 near the distal end thereof, as an example. Wing 243 may be positioned by arm 242 in spaced relation above a camera 236 mounted on camera-mounting member 234 so that camera 236 does not block or does not significantly block the flow of air across stabilizing wing 243.

Weight 270 of the swing-arm assembly 218 may be disposed on arm 242 of tail assembly 216. Only one weight 270 is depicted, however any suitable number and/or sizes of weights 270 can be employed. Weight 270 may include one or more O-rings 299 disposed between an interior surface thereof and a sidewall of arm 242 to frictionally engage the sidewall and at least partially resist sliding movement of weight 270 along arm 242. The interior surface of weight 270 may include one or more annular channels within which O-rings 299 can be seated. O-rings 299 enable weight 270 to be translated along arm 242 to adjust a position of weight 270 and to maintain a position of weight 270 during operation of camera mount 210.

Alternatively or additionally, one or more frictional pads or other frictional members can be disposed between weight 270 and arm 242, and/or arm 242 and/or weight 270 can be coated or formed from a material having frictional properties to at least partially resist sliding movement between weight 270 and arm 242. A set screw or other fastener may also be disposed in weight 270 to impinge or engage the sidewall of arm 242 to resist movement of weight 270.

Shaft 212 of camera mount 210 can be disposed at an angle or tilted with respect to vertical (e.g., the gravitational vector) to provide a directional bias for camera mount 210 as described previously. The bias can be employed with or without the use of tail assembly 216. Additionally or alternatively, one or more leg assemblies 272 of camera mount 210 may be adjustable to change an orientation or positioning of base 280 and/or shaft 212 with respect to vertical (e.g., the gravitational vector) as will be described in further detail with respect to FIGS. 2-19. Leg assemblies 272 joining element 271 to base 280 may take other suitable forms from those depicted in FIG. 1, including any of the examples depicted in FIGS. 2-19. As depicted in FIG. 1, leg assemblies 272 may be secured to base 280 by one or more fasteners 274.

A camera mount having pivotable leg assemblies is disclosed with respect to FIGS. 2-7. According to the disclosed example, the camera mount comprises: a base; a camera-mounting member coupled to the base upon which a camera is mountable; and a plurality of legs coupled to the base to support the base relative to a surface. Each leg of the plurality of legs may form a pivotable leg assembly that includes a pair of spaced apart brackets between which a pivot ball is retained. The pivotable leg assemblies of the camera mount may be adjusted to secure or otherwise rest the camera mount upon a surface, including planar or non-planar surfaces.

Referring now to FIGS. 2-7, example camera mount 110 is depicted mounted to a surface 100 with camera, tilt-adjustment assembly, tail mount portion, and tail omitted. Camera mount 110 of FIGS. 2-7 is a non-limiting example of camera mount 210 of FIG. 1. In this example, camera mount 110 includes a base 180 having three leg assemblies 172. However, camera mount 110 may include two, four, or more pivotable leg assemblies in other examples. Each leg assembly 172 is a non-limiting example of previously described leg assembly 272 of FIG. 1, and suction cups 171 (e.g., actuated by respective levers 160) are non-limiting examples of suction cups 271 of FIG. 1. Base 180 includes a central aperture 786 (shown in further detail in FIG. 7), which is a non-limiting example of the lower central aperture 284 of FIG. 1. Aperture 786 may have a circular perimeter in at least some examples. Furthermore, in this example, base 180 includes three openings 783 (shown in further detail in FIG. 7) (or alternatively two openings as depicted in the configuration of FIG. 1) for receiving fasteners 183 as previously described with reference to fasteners 283. Openings 783 may be tapped to include threads that receive fasteners 183, for example. Again, it will be understood that other suitable configurations or elements may be used.

Camera mount 110 includes a pivot ball 186, an upper bracket 182B, and fasteners 183, which may refer to non-limiting examples of previously described pivot ball 286, upper bracket 282B, and fasteners 283 of FIG. 1. Pivot ball 186 is retained between upper bracket 182B and base 180, and resides within apertures 786 of base 180 and 187 of upper bracket 182B. Aperture 187 may have a circular perimeter in at least some examples. A shaft 112 may be integrally formed with or coupled to pivot ball 186 (e.g., as a stud). Shaft 112 may take the form of a threaded shaft. Shaft 112 may form part of or otherwise be referred to as a camera-mounting member upon which a camera may be mounted. Shaft 112 be mounted directly to a camera or to an intermediate mounting element (e.g., further forming an extension of a camera-mounting member) such as via a tapped hole formed in the camera body or the intermediate mounting element. Pivot ball 186 includes curved exterior surfaces that form at least a portion of a sphere. An orientation of shaft 112 may be adjusted by loosening one or more of fasteners 183, moving shaft 112 to a desired orientation relative to base 180, and fasteners 183 may be retightened to secure the shaft at the desired orientation.

Each leg assembly 172 may include spaced apart brackets 164 and 166 that capture and retain a ball 165. Fasteners 167 (e.g., threaded bolts) passing through openings 767 (shown in further detail in FIG. 7) in base 180 secure brackets 164 and 166 to each other, and may be loosened to change an orientation of pivot ball 165 and may be tightened to maintain the orientation of the pivot ball, such as previously described with respect to pivot ball 286 of FIG. 1. Accordingly, an orientation (e.g., angle 310 of FIG. 3) of a lower portion of leg assembly 172 including suction cup 171 may be adjusted relative to base 180. Brackets 164 and 166 may include central apertures 564 and 566, respectively, (shown in further detail in FIGS. 4 and 5). Apertures 564 and 566 may have a circular perimeter in at least some examples for capturing and retaining pivot ball 165. Pivot ball 165 includes curved exterior surfaces that form at least a portion of a sphere.

As depicted in FIG. 3, a shaft 365 may be integrally formed with or coupled to pivot ball 165 (e.g., as a stud). Shaft 365 may take the form of a threaded shaft. Shaft 365 may include a head 360 that is recessed within a recessed region 565 of pivot ball 165. Pivot ball 186 and shaft 112 of FIG. 2 may have a similar structure as pivot ball 165 and shaft 356. Shaft 365 may include one or more lock nuts 465 (shown in FIGS. 4-6) that may be used to adjust a height of the shaft, and hence a height of the leg assembly. Each leg assembly 172 further includes a foot element 162 (e.g., a plate) that is connected to shaft 365 (e.g., via a tapped opening 560 formed therein). Fasteners 163 may retain foot element 162 to suction cup 171 and associated lever 160 for locking or unlocking the suction feature of the suction cup. Lever 160 may pivot about shaft 365 in some examples. FIG. 5 shows leg assembly 172 in a tilted configuration, which can enable suction cups 171 to conform more closely to curved surfaces.

FIGS. 3-6 depict additional views of the leg assemblies 172 of camera mount 110. Fasteners 167 (e.g., threaded bolts) are retained by threaded tapped openings 563 in bracket 164 and may pass through openings 567 formed in bracket 166. However, in other examples, nuts may be used on an underside of bracket 164 to retain fasteners 167. FIGS. 5 and 6 depict an exploded view of leg assemblies 172. Alternatively, openings 767 in base 180 may be tapped, and fasteners 167 depicted in FIG. 2 may be reversed to thread from the underside into openings 767. FIG. 3 further show how the leg assemblies may be orientated at a high inward angle to accommodate surfaces having substantial curvature (e.g., vehicle windshields, vehicle bodies, etc.). As a non-limiting example, camera mount 110 can accommodate a mounting surface having an 8-10 inch radius. In an example, angle 310 of a face of a suction cup may be 21 degrees relative to the horizontal.

In at least some implementations, camera mount 210 of FIG. 1 or other camera mounts may be upgraded to include the pivotable leg assemblies 172 of FIGS. 2-19 through a kit that includes brackets 164 and 166, two fasteners 167, and one pivot ball 165 including its fastener that forms the shaft 365 (and associated lock nuts) for each leg being upgraded.

Camera mount 210 may be mounted to a surface according to a method that includes loosening the outer fasteners 167 of each leg assembly (e.g., half a turn), so each leg can freely move/pivot, placing the suction cups on the surface until all three suction cups sit flat upon and engage with the surface, pushing down and locking each suction cup using the levers, and tightening the outer fasteners 167 of each leg assembly to lock the pivot angle of each leg assembly.

The claimed subject matter includes all novel and non-obvious combinations and sub-combinations of the various processes, systems and configurations, and other features, functions, acts, and/or properties disclosed herein, as well as any and all equivalents thereof.

The invention claimed is:

1. A camera mount, comprising:
   a base;
   a camera-mounting member coupled to the base upon which a camera is mountable; and
   a plurality of legs coupled to the base to support the base relative to a surface;
   wherein each leg of the plurality of legs forms a pivotable leg assembly that includes a pair of spaced apart brackets between which a pivot ball is retained; and
   wherein for each leg of the plurality of legs, the pair of spaced apart brackets of that leg includes:
      an upper bracket that includes a first central aperture that accommodates a first portion of the pivot ball, and
      a lower bracket that includes a second central aperture that accommodates a second portion of the pivot ball.

2. The camera mount of claim 1, wherein for each leg of the plurality of legs, the upper bracket is coupled to both the base and the lower bracket via a plurality of fasteners.

3. The camera mount of claim 2, wherein for each leg of the plurality of legs:
   the upper bracket includes two openings on opposing sides of the first central aperture to accommodate the plurality of fasteners, and
   the lower bracket includes two openings on opposing sides of the second central aperture to accommodate the plurality of fasteners.

4. The camera mount of claim 3, wherein the base includes two openings for accommodating the plurality of fasteners for each leg of the plurality of legs.

5. The camera mount of claim 2, wherein for each leg of the plurality of legs:
   a distal end of the leg is made pivotable relative to the base by loosening one or more of the plurality of fasteners, and
   the distal end of the leg is made non-pivotable relative to the base by tightening the one or more of the plurality of fasteners.

6. The camera mount of claim 1, wherein for each leg of the plurality of legs, the pivot ball includes a threaded shaft that protrudes from the pivot ball and through the second central aperture of the lower bracket.

7. The camera mount of claim 6, wherein for each leg of the plurality of legs:
   the camera mount further includes a foot element coupled to the threaded shaft of the pivot ball, and
   the foot element includes a suction cup at a distal end of the leg opposite the base.

8. The camera mount of claim 1, wherein the plurality of legs includes three legs that are coupled to the base at respective locations that define a triangular pattern that forms a triangular shape that surrounds a location from which the camera-mounting member is coupled to the base.

9. The camera mount of claim 1, further comprising:
   a tilt-adjustment assembly coupling the camera-mounting member to the base;
   wherein the tilt-adjustment assembly includes an upper bracket and a pivot ball that is retained between the upper bracket and the base.

10. The camera mount of claim 9, wherein the base includes a first central aperture that accommodates a first portion of the pivot ball of the tilt-adjustment assembly; and
    the upper bracket includes a second central aperture that accommodates a second portion of the pivot ball.

11. The camera mount of claim 10, wherein the upper bracket is coupled to the base via a plurality of fasteners.

12. The camera mount of claim 11, wherein the base includes three openings arranged in a triangular pattern to accommodate the plurality of fasteners that couple the upper bracket to the base;
    wherein the triangular pattern of the base defines boundaries of a triangle that surrounds the first central aperture of the base;
    wherein the upper bracket includes three openings arranged in a triangular pattern to accommodate the plurality of fasteners that couple the upper bracket to the base;
    wherein the triangular pattern of the upper bracket defines boundaries of a triangle that surrounds the second central aperture of the upper bracket.

13. The camera mount of claim 10, wherein the camera-mounting member includes a threaded shaft that protrudes from the pivot ball and through the second central aperture of the upper bracket.

14. A camera mount, comprising:
    a base;
    a camera-mounting member coupled to the base upon which a camera is mountable; and
    a plurality of legs coupled to the base to support the base relative to a surface;
    wherein each leg of the plurality of legs forms a pivotable leg assembly that includes a pivot ball that is retained between an upper portion of the leg that includes a first central aperture that accommodates a first portion of the pivot ball and a lower portion of the leg formed by a bracket that is coupled to the base via a plurality of fasteners and that includes a second central aperture that accommodates a second portion of the pivot ball;
    wherein for each leg of the plurality of legs:
       a distal end of the leg is made pivotable relative to the base by loosening one or more of the plurality of fasteners, and
       the distal end of the leg is made non-pivotable relative to the base by tightening the one or more of the plurality of fasteners.

15. The camera mount of claim 14, wherein the distal end of each leg includes a suction cup.

16. The camera mount of claim 14, further comprising:
    a tilt-adjustment assembly coupling the camera-mounting member to the base;
    wherein the tilt-adjustment assembly includes an upper bracket and a pivot ball that is retained between the upper bracket and the base.

17. The camera mount of claim 16, wherein the camera-mounting member includes a threaded shaft that protrudes from the pivot ball and through a central aperture of the upper bracket.

* * * * *